United States Patent [19]
Prichard et al.

[11] Patent Number: 5,570,323
[45] Date of Patent: Oct. 29, 1996

[54] NAVIGATIONAL DEVICE FOR A SCUBA DIVER

[75] Inventors: D. Wayne Prichard; Joe C. Guthrie, both of Knoxville, Tenn.

[73] Assignee: Ascend Corporation, Knoxville, Tenn.

[21] Appl. No.: 375,354

[22] Filed: Jan. 19, 1995

[51] Int. Cl.$^6$ ........................................................ G01S 3/80
[52] U.S. Cl. ............................... 367/118; 367/131; 367/2; 367/910
[58] Field of Search ................................ 367/2, 131, 118, 367/910

[56] References Cited

U.S. PATENT DOCUMENTS

| | | | |
|---|---|---|---|
| 3,939,463 | 2/1976 | Kelly et al. | 367/127 |
| 4,563,758 | 1/1986 | Paternostro | 367/132 |
| 4,604,733 | 8/1986 | Brown et al. | 367/2 |
| 5,077,703 | 12/1991 | Strauss | 367/118 |
| 5,148,412 | 9/1992 | Suggs | 367/131 |
| 5,185,605 | 2/1993 | Roberts, Jr. et al. | 340/850 |
| 5,185,725 | 2/1993 | Kent et al. | 367/6 |
| 5,247,489 | 9/1993 | Pirie | 367/127 |
| 5,303,206 | 4/1994 | Bemb et al. | 367/127 |
| 5,331,602 | 7/1994 | McLaren | 367/6 |

OTHER PUBLICATIONS

*SPORT* Magazine, Art. name—DiveTracker™–Navigate with Confidence, Author unknown, Pages attached.
*CALIFORNIA DIVING NEWS* Magazine, Divetracker™–Sport Sonar Based, Author unknown, Pages attached.
DIVE–SCAN, Personal Sonar System, RJE Int'l, Inc., 2192 Dupont Dr. Ste. 110, Irvine, California 92715.
DIVE–TRAK, Personal Diver Navigational Systems, RJE Int'l, Inc., 2192 Dupont Drive, Ste. 110, Irvine, California 92715.
MARK–TRAK, Personal Diver Navigation Systems, RJE Int'l, Inc., 2192 Dupont Drive, Ste. 110, Irvine, California 92715.

*Primary Examiner*—J. Woodrow Eldred
*Attorney, Agent, or Firm*—Pitts & Brittian, P.C.

[57] ABSTRACT

A navigational device (10) for assisting a scuba diver in determining a direction toward and a distance from a dive boat (12) or to a buoy near the shore at which point the dive originated. The navigational device (10) includes a transponder unit (16) carried by a boat (12) and an interrogator unit (34) carried by a diver. The interrogator unit (34) includes at least one transducer (68) positioned for detecting signals from the transponder unit (16). Direction and distance indicators (46,50) are carried on the surface of the interrogator unit (34) for visual indication to the diver. The transponder unit (16) repeatedly pulses an identification signal to be received by the interrogator unit (34). When a valid identification signal is received by the interrogator unit (34), the direction from which the signal was received is determined and displayed. When the distance to the boat (12) is required, a signal is emitted from the interrogator unit (34). Upon receipt of the distance request signal, the transponder unit (16) emits a distance response pulse. The distance between the diver and the boat (12) is then determined by the interrogator unit (34) as a function of the time elapsed between the emission of the distance request signal and the receipt of the distance response pulse.

14 Claims, 5 Drawing Sheets

NAVIGATIONAL DEVICE FOR A SCUBA DIVER

TECHNICAL FIELD

This invention relates to the field of scuba diving. More specifically, the present invention relates to a device for assisting a scuba diver in determining a bearing and distance to his or her dive boat, or to a point near the shore where the dive originated.

BACKGROUND ART

In the field of scuba diving it is well known that it is sometimes difficult for a diver to find his or her way back to the dive boat. There are several situations which make this especially difficult. Specifically, when the diver cannot see the dive boat, navigating a route to the boat is difficult. Further, when several dive boats are within a close range, it can be difficult to find the boat from which the diver embarked.

Other devices have been produced for underwater communication, or for determining range and bearing of objects under water. Typical of the art are those devices disclosed in the following U.S. Patents:

| U.S. Pat. No. | Inventor(s) | Issue Date |
| --- | --- | --- |
| 4,563,758 | C.J. Paternostro | Jan 7, 1986 |
| 4,604,733 | B.F. Brown, et al. | Aug 5, 1986 |
| 5,185,605 | J.W. Roberts, Jr., et al. | Feb 9, 1993 |
| 5,331,602 | C.B. McLaren | Jul 19, 1994 |

That device disclosed by Paternostro ('758) is provided for acoustic communication between divers. This type of device, however, does not assist a diver in finding his or her way back to a dive boat. Specifically, the '758 device is not capable of determining a distance or a direction to a dive boat.

The device taught by Brown, et al., ('733), is an apparatus for determining range and bearing between a transponder and a transponder interrogator. Brown, et al., incorporate two spaced-apart hydrophones on the transponder for use in determining the direction toward the interrogator. The bearing is determined by the transponder and is communicated to the interrogator by sending a delayed signal, the delay being indicative of the bearing. Because of the configuration of this apparatus, the orientation of the two transducers must be maintained in order to give useful bearing information. For example, if the transponder is rotated ninety degrees (90°), the diver will receive an indication that he or she has moved in the opposite direction that amount, and not that the transponder has moved.

McLaren ('602) teaches an acoustic navigation and diving information system and method using the global positioning system (GPS). Specifically, the system utilizes a base buoy and a remote buoy. A diver carries a tracking unit which is in continuous communication with the buoys, which are monitored by a base station unit. This type of system determines positioning data using triangulation methods.

Finally, Roberts, Jr., et al., ('605), teach a device for monitoring the water temperature in a diver's environment, and further for monitoring the air pressure within the diver's air tank. The '605 device is not capable of determining direction or distance from a diver to a dive boat, but is used to alert a diver when he or she is swimming in dangerous conditions of which he or she may not otherwise be aware.

Although these devices provide means for communicating with and between divers, or for monitoring the activity of divers, with the exception of the Brown, et al., device, these devices do not provide for the monitoring of the position of a dive boat by the diver. Because of the complexity of the Brown, et al., device, the integrity of the device is easily compromised. Specifically, the Brown, et al., device does not provide for the direct computation of the direction and distance to the dive boat at the interrogator unit.

Therefore, it is an object of this invention to provide a means for determining the distance and direction from a diver to a dive boat.

Another object of the present invention is to provide such a means whereby the diver uses an acoustic transponder to determine the distance and direction to the dive boat.

Still another object of the present invention is to provide a means whereby the transponder incorporates a plurality of transducers for determining the direction to the boat.

DISCLOSURE OF THE INVENTION

Other objects and advantages will be accomplished by the present invention which assists a scuba diver in determining a direction toward and a distance to a dive boat. The navigational device of the present invention is comprised generally of a transponder unit and an interrogator unit. The transponder unit is lowered into the water from a dive boat via a drop line, or when a dive originates from the shore instead of a dive boat, the transponder unit is secured to a buoy anchored near the shore. The interrogator unit is held by the diver for continuous monitoring of the distance and direction to the boat.

The interrogator unit includes a housing constructed for under water use. The housing encloses the individual components of the interrogator unit. On the forward end of the interrogator unit, at least one transducer is positioned for detecting signals from the transponder unit. A display is carried on the top surface of the interrogator unit for visual indication to the diver. A plurality of user interface keys are also carried on the surface of the interrogator unit.

The interrogator display includes a direction indicator and a distance indicator. The direction indicator includes an LCD display which is illuminated based upon the direction of the dive boat.

In the transponder unit, a user interface is provided for controlling the operations thereof. A central processing unit (CPU) generates a standard identification signal in the digital domain and sends the digital data to an encoder. The encoder converts the signal to analog, the analog signal then being amplified by the transmitter and broadcast by an omni-directional transducer. After the signal is transmitted, the transmitter is turned off and the receiver is enabled. The decoder and the transponder CPU are then activated to receive data. An internal timer in the transponder CPU is initiated and after a selected period of time, a further digital signal is produced. At this time, the transmitter is again enabled, with the receiver and decoder being disabled. When a signal is received through the receiver, the transponder CPU determines whether the received signal is a valid signal from an interrogator unit. In the event a valid signal is received, the transponder CPU generates a distance response pulse.

A user interface device is provided for controlling the operation of the interrogator unit. Data received through a receiver is delivered to a decoder and a signal strength meter in parallel. When a valid standard identification signal is received and detected by a CPU incorporated in the interrogator unit, the interrogator CPU processes the signal from the signal strength meter and updates the display, and specifically the direction indicator. In the event more than one transducer is provided by the interrogator unit, the direction to the boat is determined by the relative strengths of the signals detected by the individual transducers. In order to measure the distance to the boat, the diver depresses a distance button included in the user interface. The interrogator CPU then disables the receiver. A distance request signal is then generated by the interrogator CPU, converted to analog by the encoder, amplified by the transmitter, and emitted by the transducer(s). An internal timer is simultaneously initiated by the interrogator CPU. The transmitter is then disabled and the receiver enabled. After the distance request signal is detected by the transponder CPU and the distance response pulse is received, the internal timer of the interrogator CPU is halted. The distance from the diver to the boat is then determined as the measured time on the interrogator CPU timer, minus a constant value for processing delays, and then multiplied by one-half (½) the velocity of sound in water.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
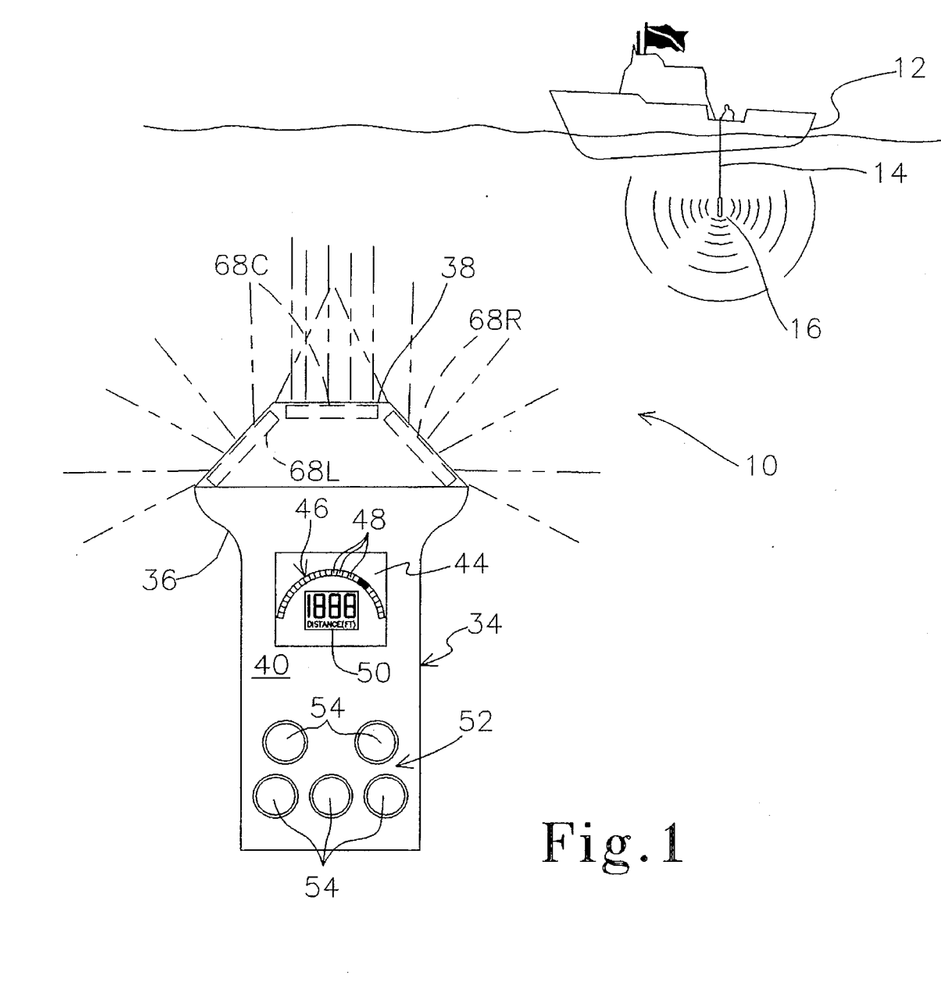
FIG. 1 is a top plan view of one embodiment of an interrogator of the navigational device for a scuba diver constructed in accordance with several features of the present invention shown in association with a transponder carried by a dive boat.

A navigational device for assisting a scuba diver in determining a direction toward and a distance to a dive boat incorporating various features of the present invention is illustrated generally at 10 in the figures. The navigational device 10 of the present invention is comprised generally of a transponder unit 16 and an interrogator unit 34. As illustrated in FIG. 1, the transponder unit 16 is lowered into the water from a dive boat 12 or from a buoy (not shown) near the shore, via a drop line 14. The interrogator unit 34 is held by the diver for continuous monitoring of the distance and direction to the boat 12. Each of the transponder unit 16 and interrogator unit 34 are self-contained and are power with batteries. However, the transponder unit 16 may be powered using the power source used to power the dive boat 12.

The interrogator unit 34 includes a housing 36 constructed for under water use. To that extent, the transponder unit 16 is also constructed for under water use. The housing 36 encloses the individual components of the interrogator unit 34. On the forward end 38 of the interrogator unit 34, a plurality of transducers 68 are positioned for detecting signals from the transponder unit 16. A display 44 is carried on the top surface 40 of the interrogator unit 34 for visual indication to the diver. A plurality of user interface keys 54 are also carried on the top surface 40 of the interrogator unit 34, however, these user interface keys 54 may be positioned elsewhere as required.

The display 44 illustrated in FIG. 1 includes a direction indicator 46 and a distance indicator 50. The direction indicator 46 includes an array of units 48 which are illuminated based upon the direction of the dive boat 12, as will be discussed below. The particular LCD unit 48 which is illuminated indicates the direction toward the dive boat 12. In the illustration, the interrogator unit 34 indicates that the dive boat 12 is to the right of the diver at approximately forty five degrees (45°). In order to find the exact direction to the boat 12, the diver in this case would turn the interrogator unit 34 to the right until the center LCD unit 48 is illuminated. The diver would then be pointed toward the boat 12. Distance determined by the navigational device 10 be is displayed on the distance indicator 50.

Figure 2:
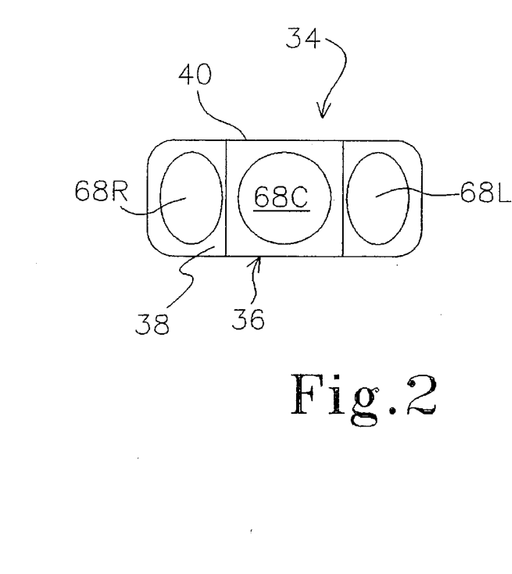
FIG. 2 illustrates an end elevation view of the interrogator of FIG. 1.

FIG. 2 illustrates further the transducers 68 incorporated in the interrogator unit 34 of FIG. 1. As illustrated in these figures, the transducers 68 of this embodiment are oriented at forty five degrees (45°) with respect to one another, with the center transducer 68C being oriented parallel with the forward end 38 of the interrogator unit 34, and the left and right transducers 68L,R being disposed at a right angle with respect to each other. The left and right transducers 68L,R in this embodiment are typically used for the specific purpose of determining the direction to the dive boat 12. To this extent, the preferred transducers 68L,R in this embodiment are broad-beam, or omni-directional, transducers.

Figure 3:
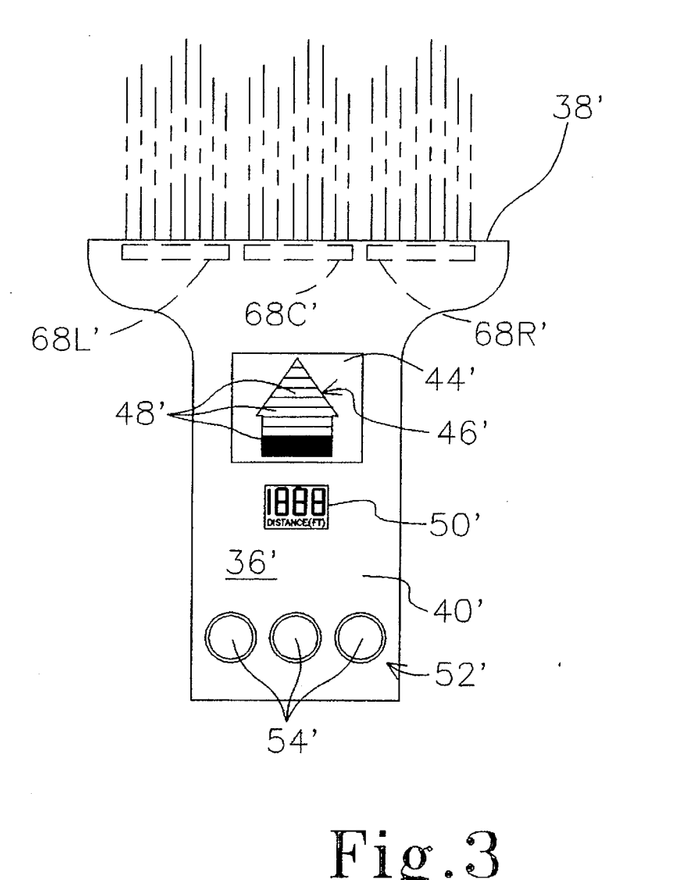
FIG. 3 is a plan view of an alternate embodiment of an interrogator of the navigational device for a scuba diver constructed in accordance with several features of the present invention.
Figure 4:
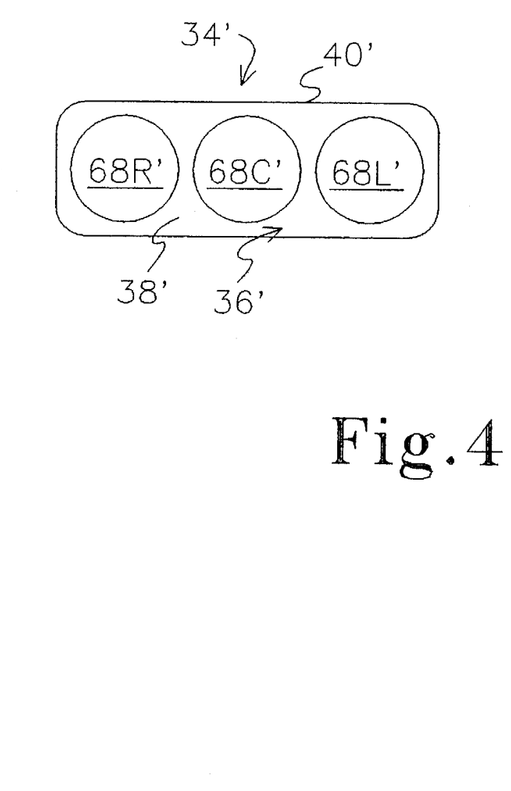
FIG. 4 illustrates an end view of the interrogator of FIG. 3.

FIGS. 3 and 4 illustrate an alternate embodiment of an interrogator unit 34' of the present invention. For ease of illustration, elements common to the embodiment illustrated in FIGS. 1 and 2, are indicated with similar numeric labels followed by a prime ('). In this embodiment, three transducers 68' are illustrated in a single plane. However, it will be understood that more or fewer than three transducers 68' may be incorporated with similar results.

As illustrated in FIG. 3, the direction indicator 46' in this embodiment includes a plurality of LCD units 48' aligned in series. The LCD units 48' are illuminated successively, with later-illuminated LCD units 48' corresponding to stronger signal strengths. As the interrogator unit 34' is moved closer in line with the dive boat 12, the strength of the direction indicator 46' is increased, with a stronger signal indicating a closer alignment with the boat 12. The direction indicator 46' is illustrated as defining a configuration of a direction arrow. However, the direction indicator 46' may define any selected shape.

Figure 5:
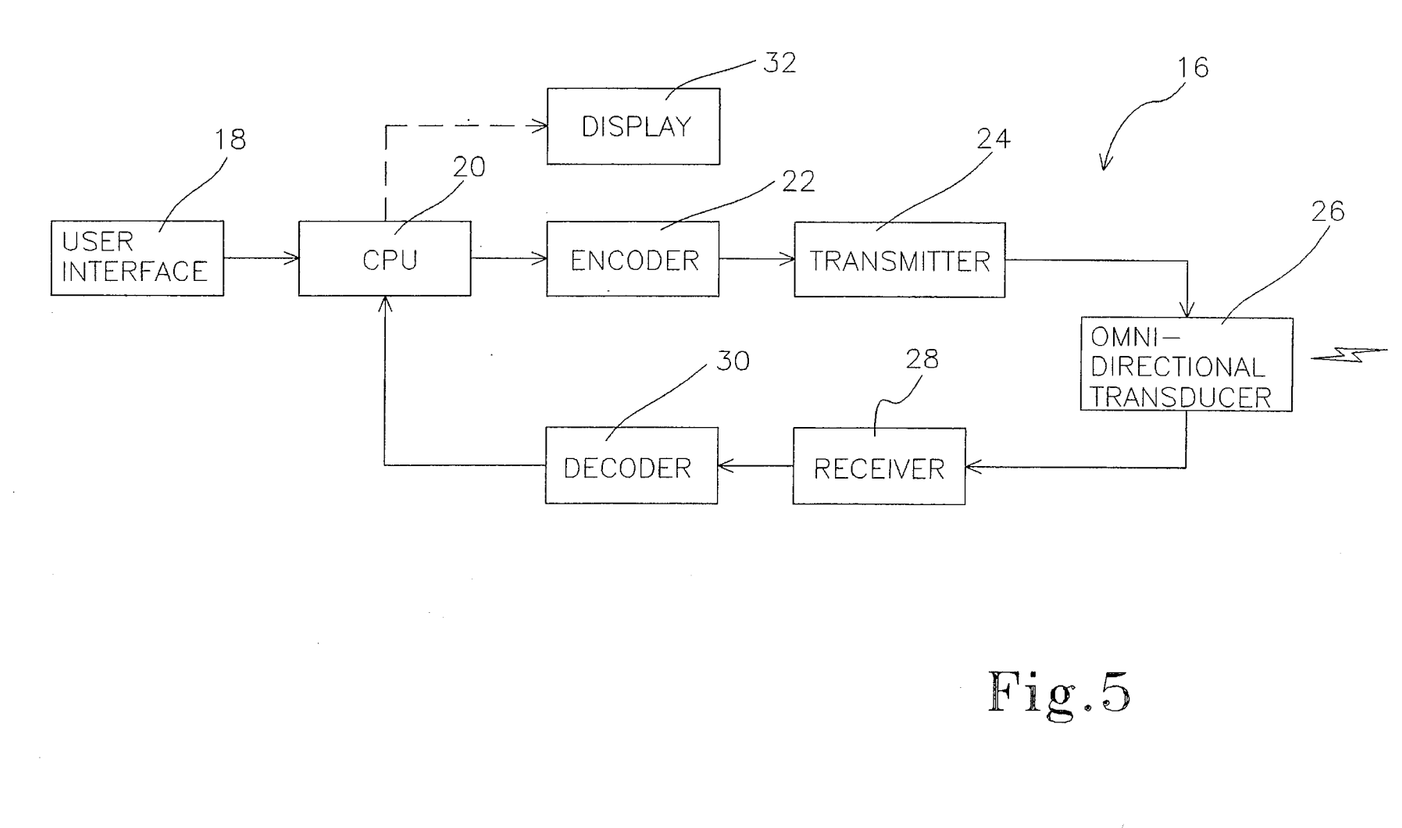
FIG. 5 is a block diagram illustrating the functions of a transponder of the present invention.

Referring to FIG. 5, the operation of the transponder unit 16 is illustrated as a block diagram. A user interface 18 is provided for controlling the operations of the transponder unit 16. A central processing unit (CPU) 20 generates a standard identification signal in the digital domain and sends the digital data to an encoder 22. The encoder 22 converts the signal to analog, the analog signal then being amplified by a transmitter 24 and broadcast by the transducer 26. In the preferred embodiment, the transducer 26 is omni-directional such that signals transmitted may be received by an interrogator unit 34 at substantially any location.

After the signal is transmitted, the transmitter 24 is turned off and the receiver 28 is enabled. The decoder 30 and the transponder CPU 20 are then activated to receive data. An internal timer in the transponder CPU 20 is initiated and after a selected period of time, a further digital signal is produced. At this time, the transmitter 34 is again enabled, with the receiver 28 and decoder 30 being disabled. When a signal is received through the receiver 28, the transponder CPU 20 determines whether the received signal is a valid signal from an interrogator unit 34. In the event a valid signal is received, the transponder CPU 20 generates a distance response pulse. Invalid signals are ignored. Functioning of the transponder unit 16 is optionally viewed via a display unit 32 of a conventional type.

Figure 6:
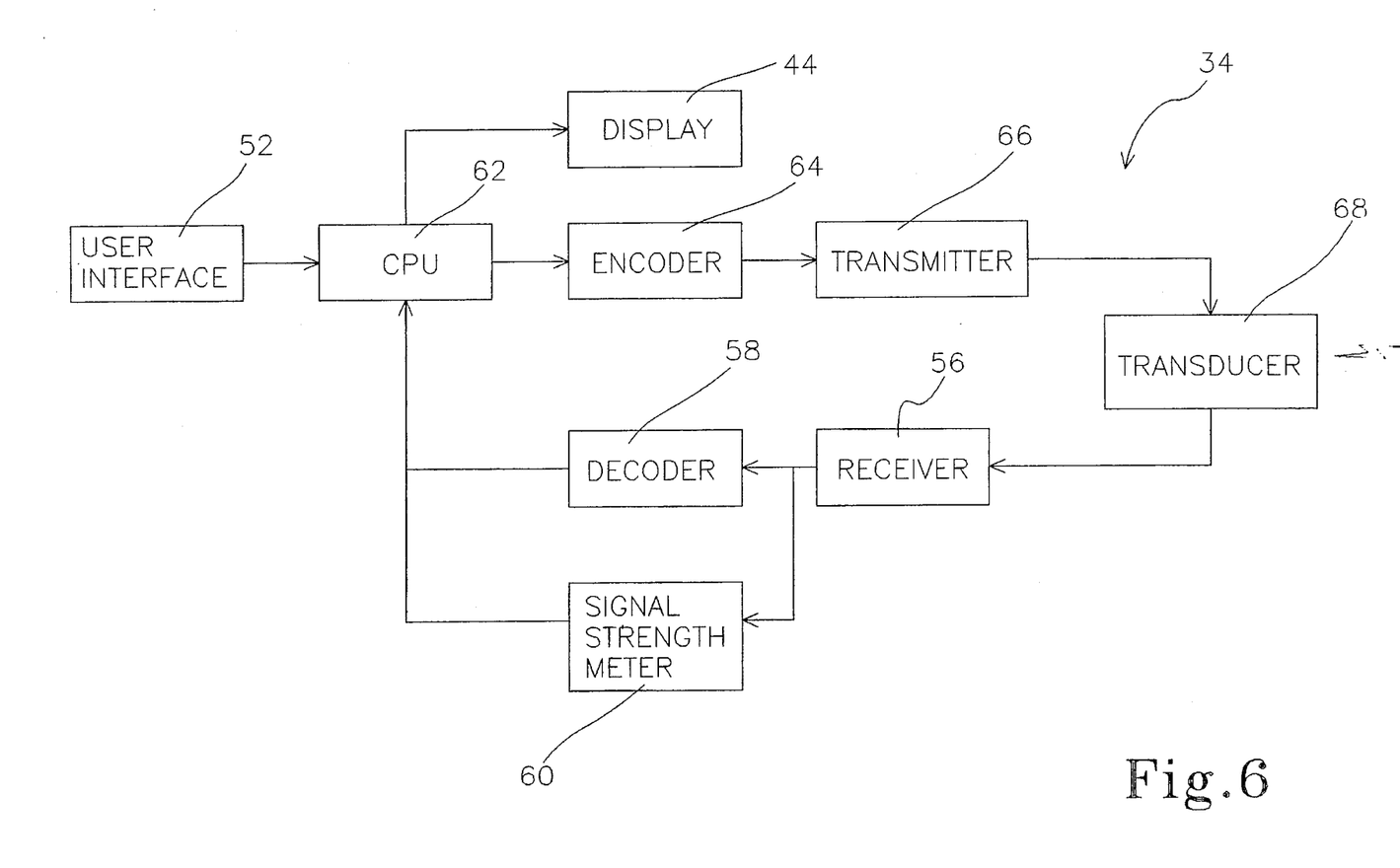
FIG. 6 is a block diagram illustrating the functions of one embodiment of an interrogator of the present invention.

FIG. 6 is a block diagram illustrating the operation of the interrogator unit 34 of the present invention. A user interface 52 is provided for controlling the operation of the interrogator unit 34. Typically, during use, the interrogator unit 34 is maintained in a receive mode. Data received through a receiver 56 is delivered to a decoder 58 and a signal strength meter 60 in parallel. When a valid standard identification signal is received and detected by a CPU 62 incorporated in the interrogator unit 34, the interrogator CPU 62 processes the signal from the signal strength meter 60 and updates the display 44, and specifically the direction indicator 46.

In this embodiment, in order to measure the distance to the boat 12, the diver depresses a distance button 54 included in the user interface 52. The interrogator CPU 62 then disables the receiver 56. A distance request signal is then generated by the interrogator CPU 62, converted to analog by the encoder 64, amplified by the transmitter 66, and emitted by the transducer 68. An internal timer is simultaneously initiated by the interrogator CPU 62. The transmitter 66 is then disabled and the receiver 56 enabled. After the distance request signal is detected by the transponder CPU 20 and the distance response pulse is received, the internal timer of the interrogator CPU 62 is halted. The distance from the diver to the boat 12 is then determined as the measured time on the interrogator CPU 62 timer, minus a constant value for processing delays, and then multiplied by one-half (½) the velocity of sound in water.

Figure 7:
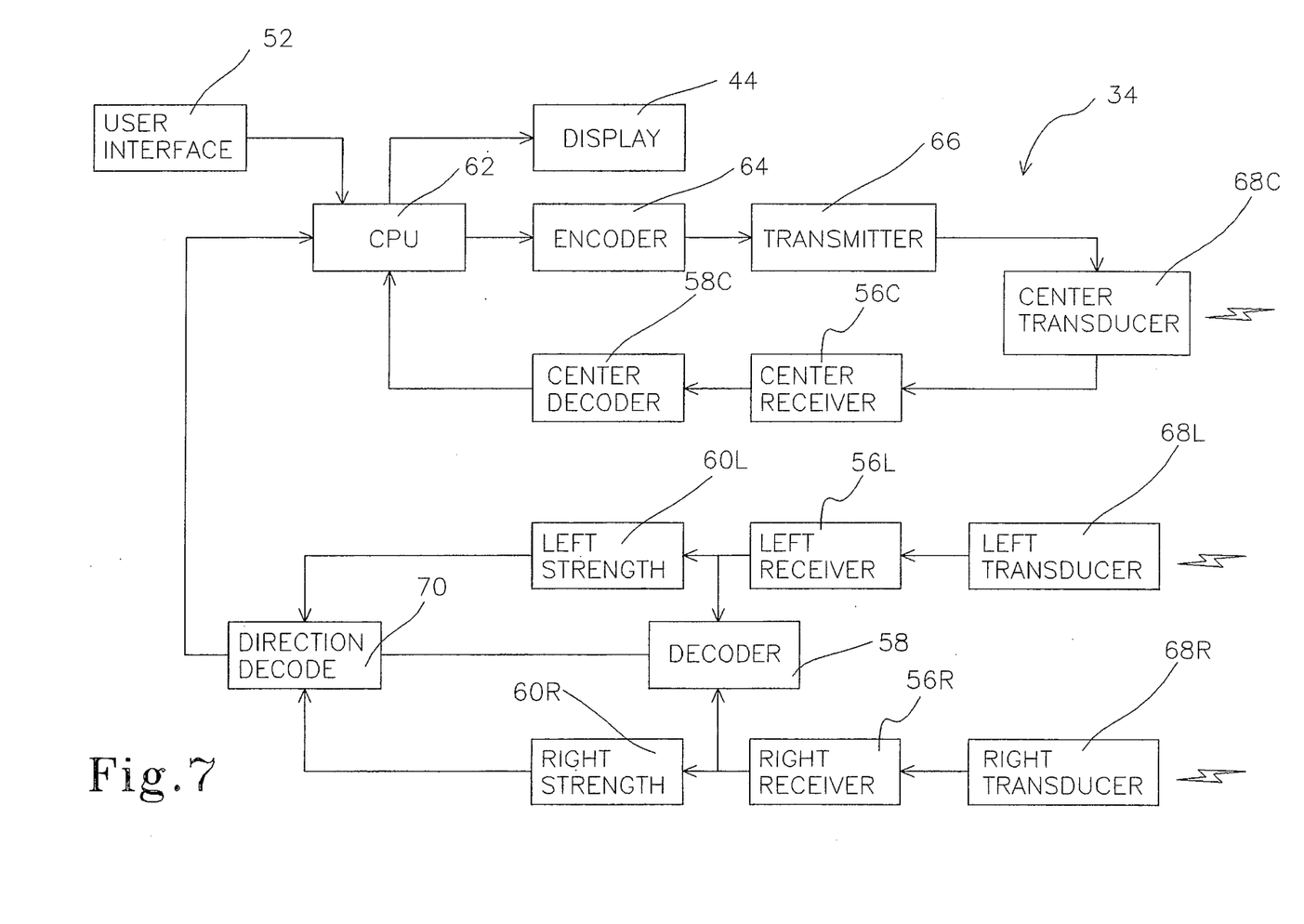
FIG. 7 is a block diagram illustrating the functions of an alternate embodiment of an interrogator of the present invention.

In the embodiment of the interrogator unit 34 illustrated in FIG. 7, three transducers 68 are provided for determining the direction to the boat 12. The center transducer 68C operates in similar fashion to the transducer 68 illustrated in FIG. 6. The left and right transducers 68L,R are provided for determining the direction to the dive boat 12. Signals received by the left and right transducers 68L,R are processed through the respective left and right receivers 56L,R. Both signals are then converted to the digital domain by the decoder 58 and are individually processed by the left and right signal strength meters 60L,R. For a valid signal, the left and right signals are individually converted to digital domain by a direction decoder 70 and compared with the output of the decoder 58 at the interrogator CPU 62 to determine the direction, with a stronger signal detected by the left transducer 68L indicating the boat 12 to the left of center, and vice versa.

It will be understood that the left and right transducers 68L,R may further be used for transmitting and receiving other signals, such as those used for emergency situations. Therefore, it is not intended for the present invention to be limited to those specific purposes disclosed.

From the foregoing description, it will be recognized by those skilled in the art that a navigational device offering advantages over the prior art has been provided. Specifically, the navigational device provides a means for accurately monitoring the direction toward and distance to a dive boat by a diver. The diver carries an interrogator unit which is capable of emitting a distance request signal and calculating the distance based upon the time required to receive a distance response pulse from a transponder carried by the dive boat. Further, the interrogator is capable of receiving a direction signal from the transponder and determining the direction from which that signal came, thus the direction of the dive boat.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A navigational device for assisting a scuba diver in determining a direction toward and a distance from a selected point, said navigational device comprising:

a transponder unit disposed at said selected point for broadcasting an identification signal and a distance response pulse and for receiving a distance request signal, said identification signal and said distance response pulse being coded to include a transponder message signal and a transponder unit identification signal to indicate a particular said transponder unit, said transponder unit including a transponder encoder for converting said identification signal and said distance response pulse from digital to analog domain and a transponder decoder for converting said distance request signal from analog to digital domain; and an interrogator unit for receiving said identification signal and said distance response pulse, said distance request signal being coded to include an interrogator message signal and an interrogator unit identification signal to indicate a particular said interrogator unit, for transmitting said distance request signal, and for determining at least a direction to said transponder unit, said interrogator unit including an interrogator decoder for converting said identification signal and said distance response pulse from analog to digital domain and an interrogator encoder for converting said distance request signal from digital to analog domain, said transponder unit producing said distance response pulse in response to receipt of said distance request signal, said interrogator unit determining a distance to said transponder unit as a function of time elapsed between transmitting said distance request signal and receipt of said distance response pulse.

2. The navigational device of claim 1 wherein said transponder unit includes at least:

a user interface fur controlling operation of said transponder unit;

a transponder central processing unit for producing said identification signal and said distance response pulse and for attaching said transponder unit identification signal to said identification signal and said distance response pulse, said transponder central processing unit being further provided for processing incoming signals to detect said interrogator unit identification signal, said transponder central processing unit rejecting said incoming signal wherein said interrogator unit identification signal is not identical to said transponder unit identification signal and processing said incoming signals received by said transponder unit wherein said interrogator unit identification signal is identical to said transponder unit identification signal;

a transmitter for amplifying said identification signal and said distance response pulse;

a transducer for broadcasting said identification signal and said distance response pulse; and a receiver for receiving at least said distance request signal.

3. The navigational device of claim 2 wherein said transponder unit further includes a display for monitoring functions of said transponder unit.

4. The navigational device of claim 1 wherein said interrogator unit includes at least:

a display for visually indicating a direction and a distance to said transponder unit;

at least one transducer for receiving said identification signal and said distance response pulse and for emitting said distance request signal;

a receiver for receiving said identification signal and said distance response pulse;

an interrogator central processing unit for processing said identification signal and said distance response pulse to detect said transponder unit identification signal, said interrogator central processing unit rejecting said identification signal and said distance response pulse wherein said transponder unit identification signal is not identical to said interrogator unit identification signal and for processing said identification signal and said distance response pulse wherein said transponder unit identification signal is identical to said interrogator unit identification signal in order to determine a direction toward and a distance to said transponder unit, and further for producing said distance request signal, said interrogator central processing unit attaching said interrogator unit identification signal to said distance request signal; and a transmitter for amplifying said distance request signal.

5. The navigational device of claim 4 wherein said at least one transducer includes a left transducer, a center transducer and a right transducer, at least said center transducer defining a narrow-beam transducer for emitting said distance request signal and for receiving said distance response pulse.

6. The navigational device of claim 5 wherein said left transducer and said right transducer each define broad-beam transducers for receiving said identification signal.

7. A navigational device for assisting a scuba diver in determining a direction toward and a distance from a selected point, said navigational device comprising:

a transponder unit disposed at said selected point for broadcasting an identification signal and a distance response pulse and for receiving a distance request signal, said identification signal and said distance response pulse being coded to include a transponder message signal and a transponder unit identification signal to indicate a particular said transponder unit, said transponder unit including at least:

a transponder encoder for converting said identification signal and said distance response pulse from digital to analog domain;

a transponder decoder for converting said distance request signal from analog to digital domain;

a user interface for controlling operation of said transponder unit;

a transponder central processing unit for producing said identification signal and said distance response pulse and for attaching said transponder unit identification signal to said identification signal and said distance response pulse, said transponder central processing unit being further provided for processing incoming signals to detect said interrogator unit identification signal, said transponder central processing unit rejecting said incoming signals wherein said interrogator unit identification signal is not identical to said transponder unit identification signal and processing said incoming signals received by said transponder unit wherein said interrogator unit identification signal is identical to said transponder unit identification signal;

a transmitter for amplifying said identification signal and said distance response pulse;

a transducer for broadcasting said identification signal and said distance response pulse; and a receiver for receiving at least said distance request signal, and an interrogator unit for receiving said identification signal and said distance response pulse, for transmitting said distance request signal, said distance request signal being coded to include an interrogator message signal and an interrogator unit identification signal to indicate a particular said interrogator unit, and for determining at least a direction to said transponder unit said distance request signal being received by said transponder unit, said transponder unit producing said distance response pulse in response to receipt of said distance request signal, said interrogator unit receiving said distance response pulse and determining a distance to said transponder unit as a function of time elapsed between transmitting said distance request signal and receipt of said distance response pulse, said interrogator unit including at least:

an interrogator decoder for converting said identification signal and said distance response pulse from analog to digital domain;

an interrogator encoder for converting said distance request signal from digital to analog domain;

a display for visually indicating a direction and a distance to said transponder unit;

at least one transducer for receiving said identification signal and said distance response pulse and for emitting said distance request signal;

a receiver for receiving said identification signal and said distance response pulse;

an interrogator central processing unit for processing said identification signal and said distance response pulse to detect said transponder unit identification signal, said interrogator central processing unit rejecting said identification signal and said distance response pulse wherein said transponder unit identification signal is not identical to said interrogator unit identification signal and for processing said identification signal and said distance response pulse wherein said transponder unit identification signal is identical to said interrogator unit identification signal in order to determine a direction toward and a distance to said transponder unit, and further for producing said distance request signal, said interrogator central processing unit attaching said interrogator unit identification signal to said distance request signal; and a transmitter for amplifying said distance request signal.

8. The navigational device of claim 7 wherein said transponder unit further includes a display for monitoring functions of said transponder unit.

9. The navigational device of claim 7 wherein said at least one transducer includes a left transducer, a center transducer and a right transducer, at least said center transducer defining a narrow-beam transducer for emitting said distance request signal and for receiving said distance response pulse.

10. The navigational device of claim 9 wherein said left transducer and said right transducer each define broad-beam transducers for receiving said identification signal.

11. A navigational device for assisting a scuba diver in determining a direction toward and a distance from a selected point, said navigational device comprising:

a transponder unit for broadcasting an identification signal and a distance response pulse and for receiving a distance request signal, said identification signal and said distance response pulse being coded to include a transponder message signal and a transponder unit identification signal to indicate a particular said transponder unit, said transponder unit including at least:
a user interface for controlling operation of said transponder unit,
a transponder central processing unit for producing said identification signal and said distance response pulse and for attaching said transponder unit identification signal to said identification signal and said distance response pulse, said transponder central processing unit being further provided for processing incoming signals to detect said interrogator unit identification signal, said transponder central processing unit rejecting said incoming signals wherein said interrogator unit identification signal is not identical to said transponder unit identification signal and processing said incoming signals received by said transponder unit wherein said interrogator unit identification signal is identical to said transponder unit identification signal;
a transmitter for amplifying said identification signal and said distance response pulse;
a transducer for broadcasting said identification signal and said distance response pulse;
a receiver for receiving at least said distance request signal;
a transponder encoder for converting said identification signal and said distance response pulse from digital to analog domain; and
a transponder decoder for converting said distance request signal from analog to digital domain; and an interrogator unit for receiving said identification signal for determining at least a direction to said transponder unit and for transmitting said distance request signal, said distance request signal being coded to include an interrogator message signal and an interrogator unit identification signal to indicate a particular said interrogator unit, said distance request signal being received by said transponder unit, said transponder unit producing a distance response pulse in response to receipt of said distance request signal, said interrogator unit receiving said distance response pulse and determining a distance to said transponder unit as a function of time elapsed between transmitting said distance request signal and receipt of said distance response pulse, said interrogator unit including at least:
a display for visually indicating a direction and a distance to said transponder unit;
at least one transducer for receiving said identification signal and said distance response pulse and for emitting said distance request signal;
a receiver for receiving said identification signal and said distance response pulse;
an interrogator central processing unit for processing said identification signal and said distance response pulse to detect said transponder unit identification signal, said interrogator central processing unit rejecting said identification signal and said distance response pulse wherein said transponder unit identification signal is not identical to said interrogator unit identification signal and for processing said identification signal and said distance response pulse wherein said transponder unit identification signal is identical to said interrogator unit identification signal in order to determine a direction toward and a distance to said transponder unit, and further for producing said distance request signal, said interrogator central processing unit attaching said interrogator unit identification signal to said distance request signal;
a transmitter for amplifying said distance request signal;
an interrogator decoder for converting said identification signal and said distance response pulse from analog to digital domain; and
an interrogator encoder for converting said distance request signal from digital to analog domain.

12. The navigational device of claim 11 wherein said transponder unit further includes a display for monitoring functions of said transponder unit.

13. The navigational device of claim 11 wherein said at least one transducer includes a left transducer, a center transducer and a right transducer, at least said center transducer defining a narrow-beam transducer for emitting said distance request signal and for receiving said distance response pulse.

14. The navigational device of claim 13 wherein said left transducer and said right transducer each define broad-beam transducers for receiving said identification signal.

* * * * *